United States Patent [19]
Bretthauer

[11] 3,741,063
[45] June 26, 1973

[54] ADJUSTABLE JIG FOR PORTABLE ELECTRIC SAWS

[76] Inventor: Frank N. Bretthauer, Route 3, Putnam Valley, N.Y. 10579

[22] Filed: Apr. 6, 1972

[21] Appl. No.: 241,983

[52] U.S. Cl.................. 83/745, 83/522, 83/471.3
[51] Int. Cl............................ B27b 9/04, B27b 5/20
[58] Field of Search.............. 143/6 G; 83/745, 83/471.3, 522, 761, 767, 471.2, 477.1; 269/295

[56] References Cited
UNITED STATES PATENTS
3,368,594  2/1968  Drumbore........................... 143/6 G
2,595,322  5/1952  Avery ................................ 143/6 G
2,633,162  3/1953  Neuenschwander................ 143/6 G
2,596,524  5/1952  Bridwell............................. 143/6 G
2,735,456  2/1956  Grier et al. ........................ 143/6 G Primary Examiner—Donald R. Schran
Attorney—David L. Just

[57] ABSTRACT

A jig for portable electric saws is disclosed. With the jig, wood and other materials can be cut with electric hand saws to the same degree of precision as is now available only with bench and radial arm saws.

7 Claims, 5 Drawing Figures

Patented June 26, 1973

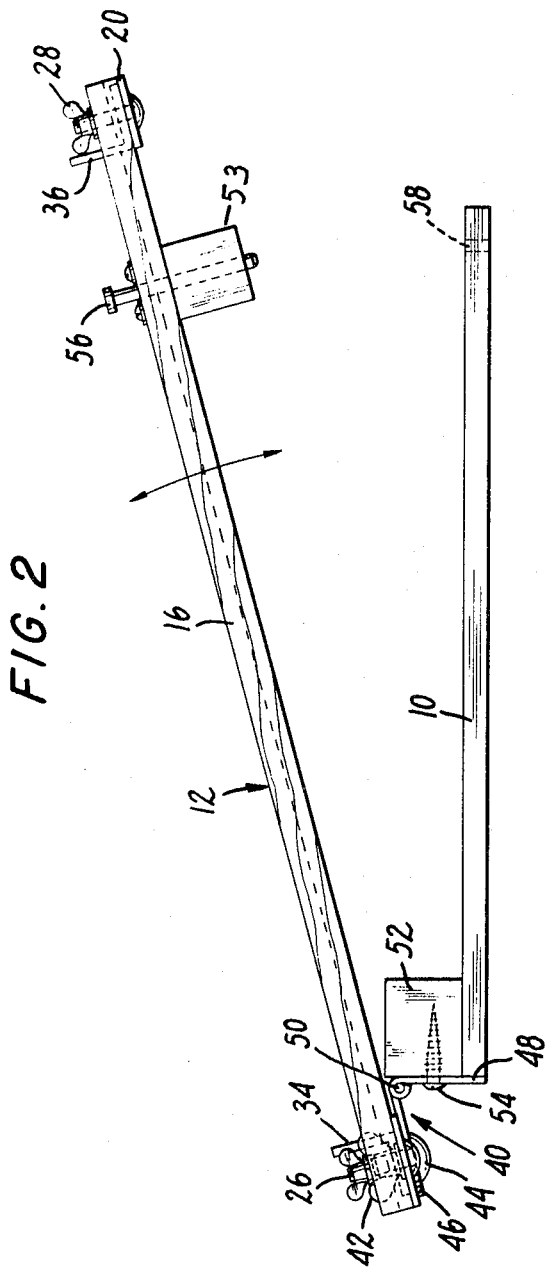
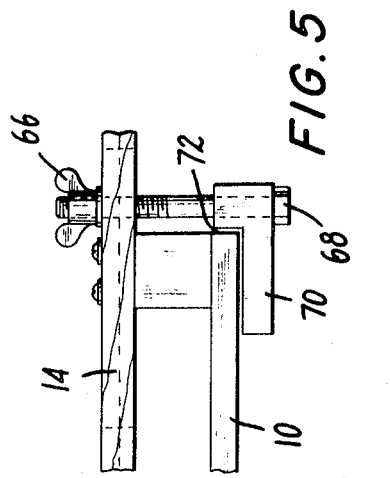
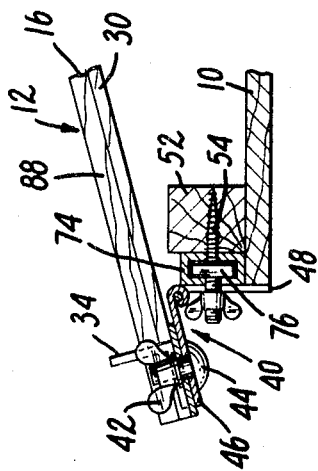

ADJUSTABLE JIG FOR PORTABLE ELECTRIC SAWS

The present invention is a new and useful adjustable jig which enables portable hand saws to be used to make precision cuts which can now only be made with expensive permanently mounted saws. The invention brings the precision of permanently mounted saws within the means of persons who can only afford portable saws. While it is thus useful for individual consumers, it also has application for industrial consumers since it eliminates the need for moving a bench type saw to a job location in order to make precision cuts.

The jig is adjustable so that virtually any brand or type of portable saw can be used, including circular saws, reciprocating saws and the like.

These and other features of the present invention may be more fully understood with reference to the accompanying drawings in which like parts refer to like numbers and in which:

FIG. 2 is a side view of the jig;

FIG. 4 shows an alternate form of construction of the jig; and

FIG. 5 is an alternate form of releasable attachment means to be used with the jig.

Figure 1:
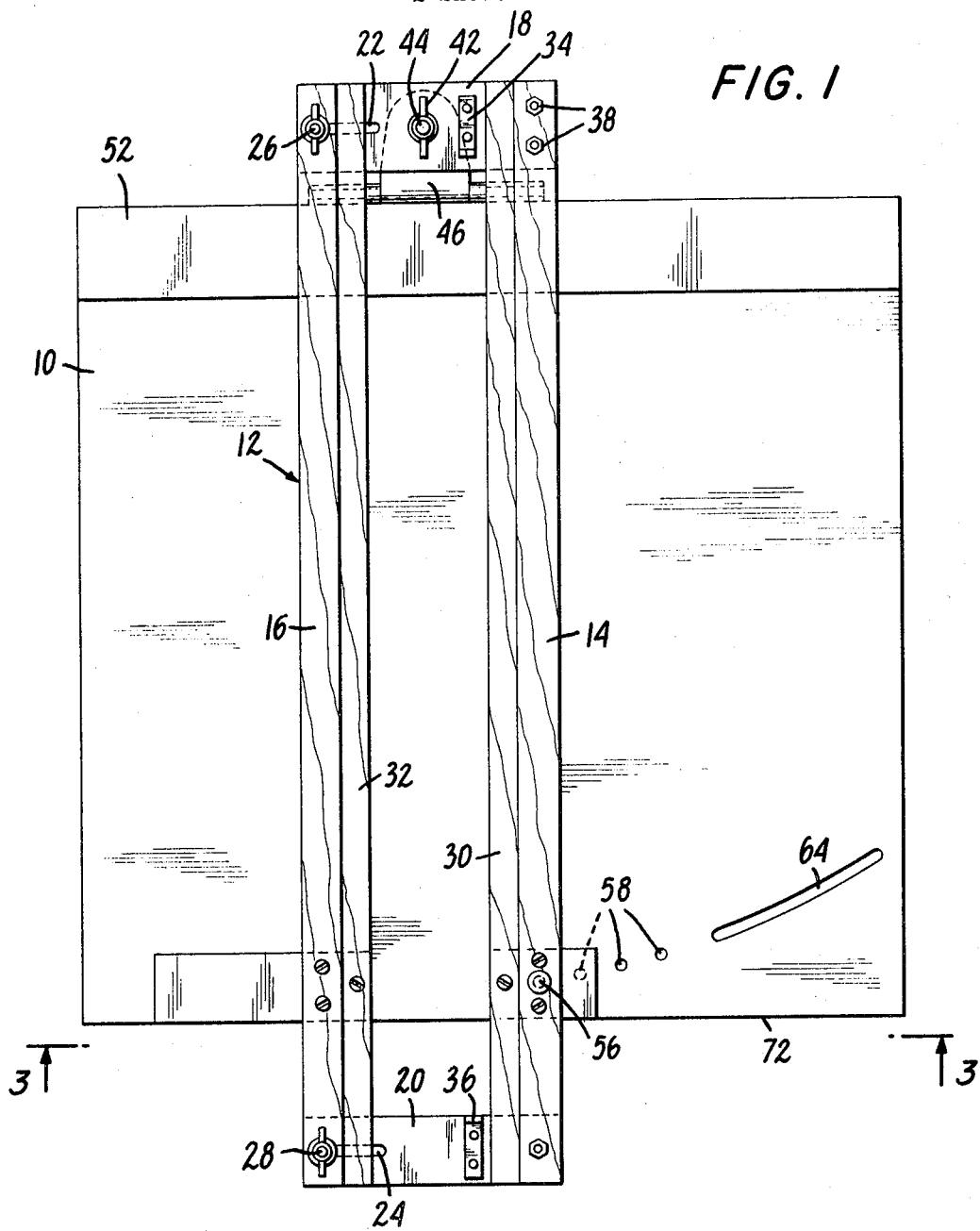
FIG. 1 illustrates a top view of the jig made in accordance with the present invention.

Referring to FIG. 1 there is shown a work board 10 having the jig 12 of the present invention mounted thereon. The jig 12 comprises two side rails 14 and 16 and end pieces 18 and 20. Side rail 16 is transversely movable on end pieces 18 and 20 in guide holes 22 and 24 respectively. Wing nuts 26 and 28 are used to secure rail 16 to ends 18, 20. Rail 16 is movable with respect to rail 14 in order to accommodate different widths of saws. Guide holes 22 and 24 are of sufficient length so that rail 16 can be spaced from rail 14 at a suitable distance to accommodate most portable electric saws. When the jig is being made for a particular brand of saw, rail 16 may be permanently affixed to end pieces 18 and 20 since it is then not necessary to adjust rail 16. It will be understood that where it is desired that rail 16 be movable, means other than the wing nuts and guide holes disclosed may be used. For example, a series of pins can be put into ends 18 and 20 and corresponding holes can be made in guide rail 16. Alternatively, guide rail 16 may be wrapped around end pieces 18 and 20 so that it is in frictional engagement with the end pieces.

Figure 3:
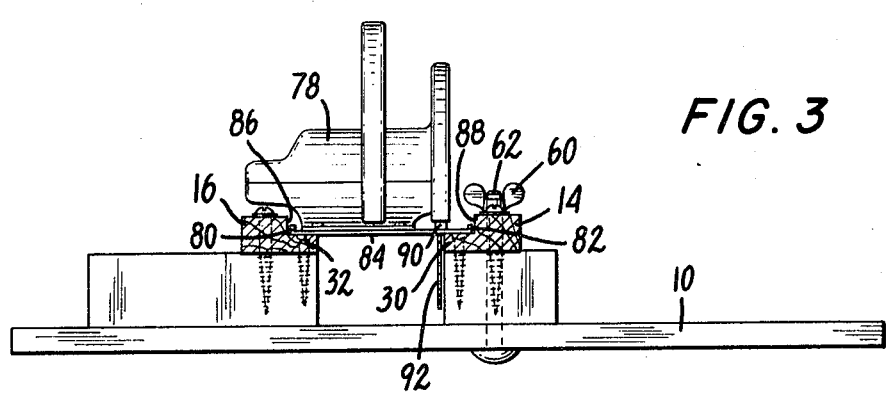
FIG. 3 is an end view partly in cross-section through line 3—3 of FIG. 1.

Recesses 30 and 32 are provided in guide rails 14 and 16 respectively and the portable saw sits in recesses 30 and 32 as can be more fully seen with respect to FIG. 3. Locking means may be provided on the top of the rails to keep the saw in the rail but in the preferred embodiment there is no locking means so that the saw is easily removed. Suitable locking means would be provded by making the recesses in the facing sides of the rails 14 and 16 in the form of grooves. Recess 30 is preferably of sufficient width to hold the blade guard of a circular saw in a retracted position. The width of recess 30 may be adjustable for this purpose if desired. When the blade guard of a circular saw is held in a retracted position by recess 30, the blade guard will still be operative to cover the blade if the circular saw is removed from the jig whether purposely or accidentally.

Stops 34 and 36 are preferably provided at each end of the jig in order to prevent the saw from traveling too far forward or too far back. These stops may be seen more clearly in FIG. 2. Rail 14 is fixedly mounted to end 18 as for example by bolts and nuts 38. End 18 is pivotably mounted on bracket 40 (FIG. 2). The pivotal mounting may be by wing screw 42 in conjunction with bolt 44 as shown or may be simply a pin or other suitable means. Bracket 40 comprises legs 46 and 48 (FIG. 2) which are hingedly mounted at 50 to permit lifting of the jig as shown in FIG. 2. A spacer 52 is provided between the jig 12 and the work board 10 so that work can be inserted between the jig and the work board. The jig may be mounted to the spacer 52 by screw 54 as shown. The spacer and the work board are not considered a necessary part of the jig and may be supplied separately by the consumer. Releasable alignment means 56 are provided for securing the jig against axial movement. As shown, the releasable alignment means is simply an alignment pin which can be inserted in hole 58 to hold the jig in position. A series of holes 58 may be provided if desired whereby different angles can be provided with respect to the work stop spacer 52. The releasable alignment means may also be a wing nut 60 and bolt 62 shown in FIG. 3 in which case there is preferably provided a guide hole 64 in which the jig can be moved.

As shown in FIG. 5, the releasable means may comprise a wing nut 66 and bolt 68 with an "L" shaped piece 70 which butts against the work board 10. In order to compensate for changing distances when the jig is pivoted, the bolt 68 may be longitudinally movable in rail 14 or, alternatively, the work board 10 may be curved along end 72.

Additional alignment means may be provided if desired. For example, a pin hole may be provided in rail 14 at spacer 52 so that a pin can be put through rail 14 into spacer 52. With this additional alignment, a single saw kerf can be made in the spacer 52 and, since the jig will always come to this position because of the alignment pin, this kerf may be used as a cutting guide. In this manner, extremely accurate cuts can be made. A corresponding pin hole could also be provided in rail 16 if desired.

Spacer 53 is provided at the front end of the jig and it is normally intended that the work to be cut will fit between the spacers 52 and 53. Work board 10 is thus made of a suitable length to accommodate the work intended. Where it is desired to cut or otherwise work on pieces which do not fit between spacers 52 and 53, the jig may be lifted and spacer 53 may "sit" on top of the work. The work can thus be cut from 52 to 53, and then rotated and cut from the other side. Since normally the largest work piece on which work is done is 4×8 foot sheet of plywood or panelling, the preferred distance between spacers 52 and 53 is 4 feet. If desired, spacer 53 may be shorter than spacer 52 so that the jig will be parallel with the base 10 when the spacer 53 "sits" on the work. Thus, if three-fourths inch plywood is the normal wood used, then spacer 53 should be three-fourths inch shorter than spacer 52. Where the jig is to be used with different thicknesses of wood, and sometimes spacer 53 will "sit" on the wood, spacer 53 may be made adjustable in length. One suitable method of doing this is with an eccentrically mounted rectangle mounted on spacer 53 which may be moved to different positions by means of a wing nut.

In FIG. 4 is shown an alternative embodiment of mounting bracket 40 in which the leg 48 and thus the entire jig is movably mounted in a "C" shaped channel 74. Leg 48 is slidably mounted in "C" channel 74 as for example by bolt and wing nut 76. It will be appreciated that leg 48 and thus the entire jig may be slidably mounted to spacer 52 by other suitable means such as tongue and groove, etc. Referring again to FIG. 3 there is shown a circular saw 78 resting on recesses 30 and 32 of rails 14 and 16. Ends 80 and 82 of the base 84 of the saw 78 are in close abutment with sides 86 and 88 of recess 30 and 32. With this arrangement, the saw can be moved in recesses 30 and 32 along the length of the jig 12 in a straight line so that cuts can be made which are comparable to the cuts obtained from bench, radial arm and similar permanently mounted saws. Blade guard 90 rests on recess 30 and blade 92 extends down towards base 10. It will of course be understood that shims (not shown) can be provided on the work board so that the work to be cut by the blade 92 can be completely severed without cutting into work board 10. Alternatively the blade 92 can extend down to the work board 10 whereby shims are not required. Additionally, blade 92 can be raised so that the saw 78 can be used for rabbetting, ploughing or the like. Rabbetting, dadoing, ploughing, chamfering and the like are especially easy to do when the jig is transversely movable as shown in FIG. 4. It can thus readily be seen that this opens up an entire new area to the use of circular saws.

While parts of the jig are shown as being made out of wood, it will be understood that metal and plastic may similarly be used, expecially stamped metal parts for the ends and rails.

It will be understood that the claims are intended to cover all changes and modifications of the preferred embodiments of the invention, herein chosen for the purpose of illustration, which do not constitute departures from the spirit and scope of the invention.

What is claimed is:

1. A jig for use with portable electric saws comprising:
   a. spaced rails onto which the saw can sit and along which the saw can travel;
   b. end pieces to maintain the proper spacing of said rails and to form a rectangularly shaped assembly;
   c. said rectangularly shaped assembly being pivotably mounted towards one end on a bracket;
   d. said bracket comprising two legs hingedly connected by means of a pin with the rectangularly shaped assembly being pivotably mounted on one of said legs;
   e. the other said bracket leg being longitudinally slidably mounted in a "C" channel by sliding means which are connected to the said other bracket leg and said sliding means having its end away from the bracket of a larger size than the longitudinal opening in the "C" channel whereby the sliding means and thus the bracket is prevented from falling out of the longitudinal opening of the "C" channel during normal operation;
   f. locking means to fix the position of the bracket relative to the "C" channel at any desired location;
   g. said "C" channel being adapted to be mounted on a work board; and
   h. means toward the other end of the rectangularly shaped assembly from the bracket to fix the position of the rectangularly shaped assembly with respect to the work board.

2. The jig of claim 1 wherein at least one of said rails is adjustable with respect to the other rail.

3. The jig of claim 1 wherein stop means are provided on each end piece to prevent the saw from travelling beyond said stop means.

4. The jig of claim 1 wherein the rails have recesses therein to accommodate the base of the saw.

5. The jig of claim 1 wherein the means of part (h) comprise a pin.

6. The jig of claim 1 wherein the means of part (h) comprise a bolt and wing nut.

7. The jig of claim 8 wherein the means of part (h) further comprise an L-shaped piece through which said bolt passes and which is adaptable to engage a work board.

* * * * *